Nov. 5, 1957  D. D. CENCE  2,811,725
COMPARTMENT ATTACHABLE TO THE ROOF OF A MOTOR VEHICLE
Filed Sept. 20, 1954  2 Sheets-Sheet 1
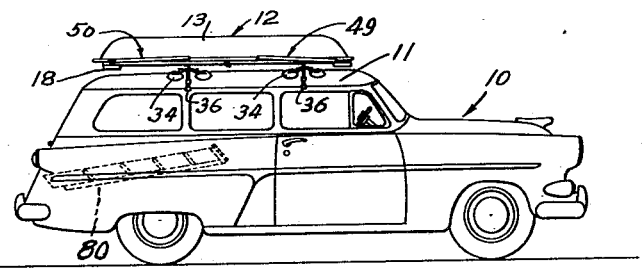
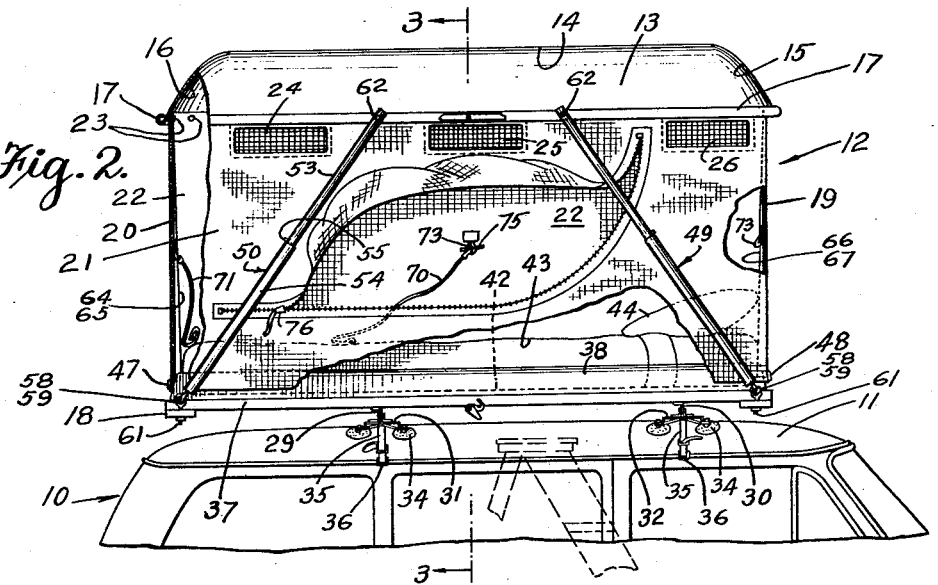
INVENTOR.
David D. Cence
BY
C. G. Stratton
ATTORNEY Nov. 5, 1957 D. D. CENCE 2,811,725
COMPARTMENT ATTACHABLE TO THE ROOF OF A MOTOR VEHICLE
Filed Sept. 20, 1954 2 Sheets-Sheet 2
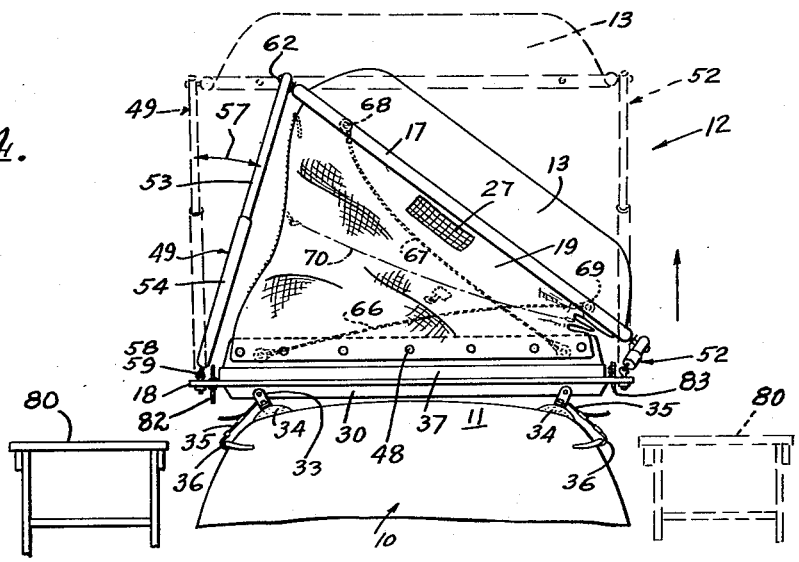
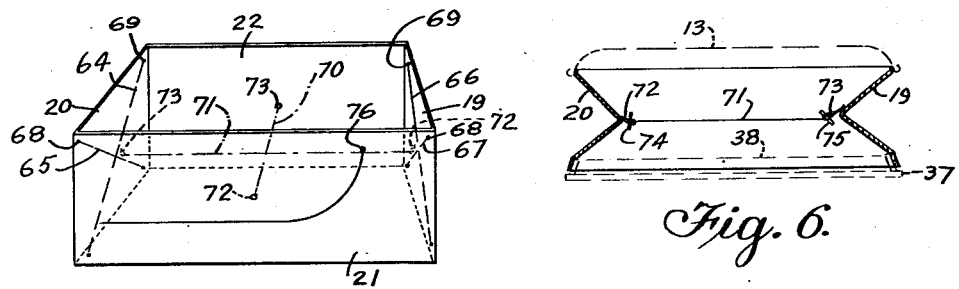
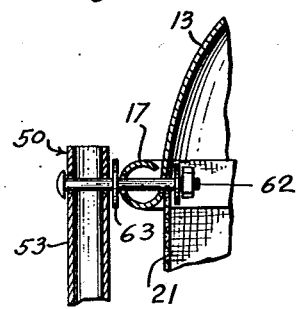
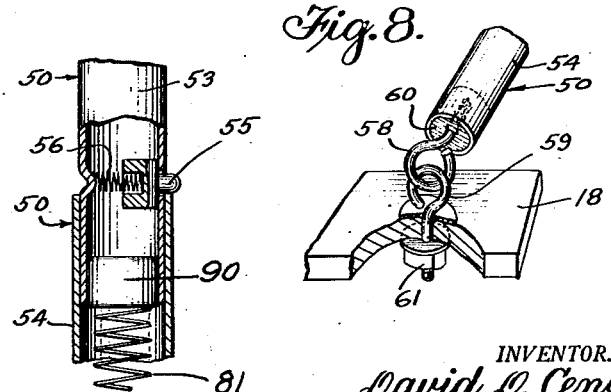
INVENTOR.
David D. Cence
BY
C. G. Stratton
ATTORNEY United States Patent Office 2,811,725
Patented Nov. 5, 1957

2,811,725

COMPARTMENT ATTACHABLE TO THE ROOF OF A MOTOR VEHICLE

David D. Cence, Glendale, Calif.

Application September 20, 1954, Serial No. 457,181

9 Claims. (Cl. 5—119)

This invention relates to a sleeping compartment with foldable sides and a roof, and which is mountable on top of a motor vehicle.

It is an object of this invention to provide a sleeping compartment mountable on top of a motor vehicle such as a passenger car, having a roof or top, with the sleeping compartment being mounted on the roof.

An additional object of this invention is to provide a sleeping compartment for the roof of an automobile which may be readily collapsed when not in use, and which has a horizontal base for supporting a mattress, a hard top or roof, four flexible walls, and four telescoping side members for raising and lowering the roof of the compartment.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes preferred embodiments of the present invention, which are given by way of illustration or example only.

In the drawings, like reference characters designate similar parts in the several views.

Fig. 1 is a side elevational view of a motor vehicle with the compartment mounted on its roof in a collapsed state.

Fig. 2 is an enlarged side view of the sleeping compartment and the roof portion of a passenger car.

Fig. 3 is an end cross-sectional view of the sleeping compartment, taken along the line 3—3 intersecting Fig. 2.

Fig. 4 is a rear or front view of the compartment, with one side of the compartment in a collapsed condition.

Fig. 5 is a perspective view of the four side walls of the compartment.

Fig. 6 is a side elevational view of the front and rear walls of the compartment in partially collapsed condition.

Fig. 7 is a vertical cross-sectional view of a connection between the roof of the compartment and the telescoping tube supporting the roof of the compartment.

Fig. 8 is a perspective view of the lower end of the telescoping tube and of the bottom frame of the compartment, illustrating the eye connection between the tube and the frame.

Fig. 9 is a vertical view of a portion of the telescoping tube, partly in section, illustrating the interlocking connection between the two tubes.

Fig. 10 is a vertical cross-sectional view of the two portions of the compartment walls, and of an elastic member which is used for collapsing the compartment walls in the manner illustrated in Fig. 6.

It should be understood that the drawings illustrate merely a preferred embodiment of the invention and that other embodiments are contemplated within the scope of the appended claims.

Referring to the drawings, and particularly to Fig. 1, a passenger motor vehicle 10 is illustrated with the vehicle top 11 supporting the sleeping compartment 12 in a collapsed state. The compartment includes the top 13 which has a flat rectangular roof portion 14 and four side walls 15 and 16 which terminate in an edge bead 17 at the bottom of the roof. This roof member can be made of such materials as sheet aluminum or reinforced plastics so as to make it as light as possible and at the same time rust-resisting. The flat portion 14 and the side walls, such as walls 15 and 16, form an inverted dish or cup which, when lowered into the position illustrated in Fig. 1, completely covers the base of the compartment and the entire contents of the compartment, thus protecting it from rain and dust.

In the lowered position, the bead 17 of the compartment rests directly on the bottom frame 18 of the compartment on all four sides, thus completely sealing off the inner contents of the compartment. The compartment has four side walls 19, 20, 21 and 22, which are made of any moisture-proof material, such as impregnated canvas or plastics, all of which are impervious to moisture.

The top portions of the side walls are attached to the roof of the compartment in any suitable manner, such as by means of snaps 23, so that the side walls can be detached from the top for cleaning or replacement. The upper portions of the side walls are provided with ventilating windows 24, 25, 26 and 27, provided with curtains 28 made of moisture-proof material which are used for closing off the ventilating compartment. Appropriate snaps or zippers are used for making a tight moisture- and dust-proof connection between the side walls and the curtains.

The bottom portion of the compartment includes the previously-mentioned rectangular frame 18 which is made of strong but light wood or rust-proof sheet metal which is supported on the roof 11 by means of metal cross members 29 and 30 mounted on the brackets 31, 32, 33, which are equipped with rubber suction cups 34 resting directly on the surface of roof 11. To stabilize the lateral position of the brackets and cross members 29 and 30, each bracket is equipped with a strap 35 which has a hook 36 engaging the molding or the roof bead of the motor vehicle in the manner illustrated in Figs. 1, 2 and 3. The same figures also illustrate the strap being provided with a buckle so that the supporting frame 18 can be adjusted to a horizontal position by tightening the buckles on the straps.

Frame 18 supports a floor member 37 which may be made of plywood or sheet metal. On top of the floor member there is provided an additional frame having four side walls 38, 39 and 40, the fourth side wall not being visible in the drawings. These side walls are rigidly attached to the floor and together with the floor member 37 form a recessed well for supporting a mattress 42. The side walls 38, 39 and 40 prevent this mattress from sliding off the floor. A blanket 43 and pillow 44 are placed on the mattress in the usual manner.

The bottom portions of the collapsible walls 19, 20 and 21 are attached to the side walls 38, 39 and 40 by means of snaps or in any other manner, this connection being illustrated at 45 and 46 in Fig. 3, and 47 and 48 in Fig. 2. The roof 13 of the compartment is supported from the frame 18 by means of collapsible or telescoping arms 49, 50, 51 and 52. Since all of these telescoping arms are identical, it is necessary to describe only one arm. The arms have an upper member 53 and a lower member 54, the upper member 53 telescoping into the lower member 54 in the manner illustrated in Fig. 9. The upper member 53 is equipped with a latching member 55 which is mounted within the upper member 53 in the manner illustrated in Fig. 9, and is tensioned or biased by means of a spring 56 to project itself through an aperture in member 53, also illustrated in Fig. 9. When it does so, it projects itself somewhat beyond the lower tube 54 when tube 53 is pulled out of tube 54 to the extent that latch 55 is free to project itself. Latches of this type are well known in the art and need no further description.

An examination of Fig. 9 reveals that when latch 55 projects itself in the manner illustrated in Fig. 9, tube 53 will be prevented from sliding into tube 54 and, therefore, roof 13 will be supported by the four telescoping arms in the manner illustrated in Figs. 2, 3 and 4.

An examination of Fig. 4 reveals the fact that it is necessary to have a joint between arm 54 or the lower tube of the telescoping arm and frame 18, so that this arm can revolve around the center of rotation located at the junction point between frame 18 and the lower arm, and it also should be free to swing transversely through an angle 57 illustrated in Fig. 4. The latter is necessary because when the roof 13 is raised from its position illustrated in Fig. 1 to that illustrated in Figs. 2 or 3, such raising of the roof, as a rule, is performed by one person who first raises one side of the roof, e. g., the left side, as illustrated in Fig. 4, and then the right side, which completes the erection of the sleeping compartment. Since the above requires two distinct operations, it follows that the roof 13 will find itself in a slanted position, illustrated in Fig. 4, when only one side of the roof is raised. This will result in the deflection of the telescoping arms from their normal vertical position, illustrated in dotted lines in Fig. 4, to the slanting position illustrated in solid lines in the same figure. It is for this reason that it becomes necessary to have an eye-joint 58—59 (Fig. 8) between frame 18 and the lower end of the telescoping end of the telescoping arm 54.

This joint is achieved by embedding a piece of wood 60 within the lower end of tube 54, whereupon eye 58 is screwed into this plug. A conventional bolt joint 61 is used between eye 59 and frame 18. The above type of erection of the roof also requires a partially flexible joint between bead 17 of roof 13 and the upper member of the telescoping arm. This joint is illustrated in Fig. 7 and includes bolt 62, a washer 63, and an appropriate hole in bead 17 for passing the shank of bolt 62 therethrough. The hole in bead 17 is made sufficiently wide so as to permit bolt 62 to swing to some extent within bead 17 when the roof assumes the slanting position illustrated in Fig. 4, bolt 62 acting as a radius arm revolving around the inner portion of the bead 17, as viewed in Fig. 7.

An examination of Figs. 2 and 4 reveals the fact that the telescoping arms become rigid arms upon lifting or raising of the roof, and since these four arms are mounted at an angle with respect to each other, and are at an angle with respect to the vertical lines passing through the upper or lower joints of the arms, it follows that the arms will resist any forward or backward swaying of the roof. The arms, therefore, stabilize completely the position of the roof in a vertical plane which is transverse or perpendicular to the longitudinal axis of the car. In order to stabilize the roof in the longitudinal plane, four cables 64, 65, 66 and 67, which cross each other approximately at right angles, in the manner illustrated in Fig. 3, interconnect the base frame 18 and said roof 13.

The cables are non-stretchable cables and can be made of such material as stranded wire. The upper ends of the cables are attached by means of loops and studs 68 and 69 (Fig. 3), to bead 17, and by means of similar loops and studs to the side wall 40. Identical connections are used for the second pair of cables. These cables stabilize the position of the roof so as to prevent it from swinging from side to side, as viewed in Fig. 3, after the roof is raised to the position illustrated in this same figure. When the roof is raised to its upper position, the cables 64 and 65 are made taut by the telescoping arms and, therefore, the length of the stabilizing cables 64 and 65 should be adjusted so as to become taut when the telescoping arms are placed into their outwardly telescoped positions, illustrated in Figs. 2 and 3. It is this relationship between the telescoping arms and the stabilizing cables that completely stabilizes the roof in transverse as well as longitudinal directions and prevents it from swaying in either direction.

The collapsible walls of the sleeping compartment are provided with two elastic cables 70 and 71 (Figs. 5, 6 and 10), which are attached to the side walls in any detachable manner such as that illustrated in Fig. 10. In Fig. 10 this attachment is obtained by means of loops 72 and 73 attached to the side walls, and bars 74 and 75 which are inserted into the loops. The elastic cable is attached to the bars 74 and 75. These cables are used for drawing the side walls inwardly in a manner illustrated in Fig. 6, when the roof is lowered from the positions illustrated in Figs. 2 and 3 to that illustrated in Fig. 1. This drawing-in action of the cables upon the opposite flexible side walls of the compartment prevents the side walls from collapsing outwardly and thus projecting themselves beyond the roof member 13 which obviously would require a manual tucking-in of the flexible side walls under the roof after it has been lowered. The elastic cables 70 and 71 perform this function automatically in the manner illustrated in Fig. 6, by drawing the side walls inwardly when roof 13 is lowered upon frame 18. These cables are unhooked after the roof has been raised and hooked on again before the roof is lowered. The unhooked position of these cables is illustrated in Figs. 3 and 2, while the hooked on position is illustrated in Figs. 5 and 6.

One of the flexible walls of the compartment, namely, wall 21, see Fig. 2, is provided with an opening, illustrated in the same figure, which is used for entering the compartment upon completion of the raising operation of the roof 13. This opening is obtained by operating tab 76 of a slide fastener which extends from the lower and then to the upper portion of the wall.

An overall examination of the described structure discloses that it can be erected very easily by first lifting one side and then the other of roof 13 by mounting a ladder 80. The latter may be carried in the car in the manner illustrated in Fig. 1.

The above simple operation at once completes the erection of the entire compartment, including its stabilization in the transverse as well as longitudinal planes in the manner described previously in the specification. A very rigid self-stabilizing compartment is achieved because of the use of stabilizing cables 64 and 65 and the telescoping arms which are inclined toward each other in the manner clearly illustrated in Fig. 2. Because of the fact that the roof 12 is made of such materials as aluminum or reinforced plastics, the erecting operation can be performed by a person possessing only limited strength, as in the case of women and children.

To facilitate such erection still further, the telescoping arms 53—54 may be provided with the biasing springs 81 (Fig. 9) which exert a constant pressure on the upper arm, such as arm 53, through an end plug 90 inserted in arm 53. When springs 81 are of sufficient strength, it becomes necessary to provide suitable latching means 82—83 for holding the roof in its lowered position. Such latches can be of any suitable form, for example, a rotatable arm having an eye at one end connecting to a stud or knob on the roof.

It is contemplated and it is within the scope of this invention to provide springs 81 of sufficient strength so as to make the roof completely self-erecting, which takes place upon the synchronous release of the latches 82—83, whose operation is made synchronous by means of a rod 86 interconnecting the two latches. Thus, when the rod is rotated, each pair of arms will be disconnected from the studs on the roof, and allow the roof to rise automatically. In this arrangement the roof is lowered in the manner illustrated in Fig. 4, by first lowering one side and then the other. Upon lowering one side, latch 83 is locked, whereupon the other side is also lowered and latch 82 is locked, which completes the lowering of the roof.

The invention thus discloses a sleeping compartment mountable on the roof of any motor vehicle having a roof of sufficient length to accommodate the suction cups 34, spaced from each other in the manner illustrated in Fig. 2, and obtaining sufficient stability of the foundation upon which the entire compartment rests.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. A compartment suitable for mounting on the roof of a motor vehicle, said compartment comprising a base, a roof for said base, four telescoping arms for supporting and stabilizing said roof in one plane of the compartment, said arms each being inclined at an angle to the vertical, and two pairs of cables crossing each other and interconnecting said roof and said base, one pair of said cables being mounted at one end of the roof and said base, and the other pair being mounted at the other end of said roof and said base for stabilizing said roof in a plane perpendicular to the first plane.

2. A compartment as defined in claim 1, in which the vertical component of the length of said telescoping arms is substantially equal to the vertical component of the length of said cables, whereby said telescoping arms tauten said cables upon the telescoping of said arms.

3. A motor vehicle compartment suitable for mounting on the roof of a vehicle, said compartment comprising a base mounted on said roof, four side walls mounted on said base, said base and said side walls constituting a well for accommodating a mattress, a roof resting on said base and covering said side walls, two pairs of telescoping arms, one pair being mounted on one side of said roof and the other pair being mounted on the other side of said roof, said telescoping arms having upper and lower ends, the upper ends of said arms being connected to said roof and the lower ends being connected to said base, each of the arms of each pair being inclined with respect to the arm of its respective pair for resisting swaying of said roof in the planes of said arms, and two pairs of stabilizing cables, one pair being mounted at one end and the other at the other end of said compartment in the respective planes perpendicular to the respective planes of said telescoping arms, for resisting swaying of said roof in the transverse planes of said cables, whereby said roof is stabilized in the longitudinal and transverse planes upon telescoping of said arms.

4. A sleeping compartment mountable on the roof of a motor vehicle, said compartment comprising a base, a roof normally resting on said base, said roof having first and second side walls and front and rear side walls, a first pair of telescoping arms interconnecting said first side wall to said base, a second pair of telescoping arms interconnecting said second side wall with said base, a pair of stabilizing cables interconnecting the front wall of said roof to said base, and an additional pair of cables interconnecting the rear wall of said roof to said base, each of said telescoping arms having an upper and a lower end, the distance between said lower ends in each pair being greater than the distance between the upper ends of each pair.

5. A sleeping compartment as in claim 4, said upper end being connected to said roof and said lower end being connected to said base, each of said ends having a swivel joint connecting each respective end respectively to said roof and said base.

6. A compartment having a base and a roof, said base and said roof having first and second sides and front and rear sides, a first pair of telescoping arms connecting the first side of said roof to the first side of said base, a second pair of telescoping arms connecting the second side of said roof with the second side of said base, each one of each pair of arms being inclined at an angle to the vertical, a first pair of cables connecting the front end of said roof to the front end of said base, a second pair of cables connecting the rear end of said roof to the rear end of said base, and swivel joints between said arms and said roof and base respectively.

7. A self-erecting compartment comprising a base and a roof each having four sides, a first pair of telescoping arms interconnecting the first side of said base with the corresponding side of said roof, a second pair of telescoping arms interconnecting the second side of said base with the corresponding side of said roof, each pair of arms being inclined at angles to the vertical, and said first and second sides being the opposite sides of said base and roof, a first pair of cables interconnecting a third side of said base with the corresponding side of said roof, and a second pair of cables interconnecting the fourth side of said base with the corresponding side of said roof, the vertical component of the length of said cables being equal to the vertical component of the length of said arms when said arms are in an extended position, and a spring within each of said arms for automatically lifting said roof into a raised position.

8. A self-erecting compartment as defined in claim 7, which also includes a latch on the first side and a latch on the second side of said base and roof for latching said roof to said base when said roof rests on said base, and means for synchronously operating said latches for releasing said roof, whereupon the springs within said telescoping members automatically raise said roof.

9. A self-erecting compartment attachable to the roof of a motor vehicle comprising a base, a roof normally resting on said base, a first pair of telescoping arms interconnecting one side of said roof with the corresponding side of said base, a second pair of telescoping arms interconnecting the opposite side of said roof with the opposite side of said base, each pair of arms being inclined at angles to the vertical, a spring within each of said arms for automatically lifting said roof into a raised position, a pair of latches for said roof, said latches being rotatably attached to said base and connectable to studs on said roof for holding said roof against the base, and a rod interconnecting each pair of latches to rotate the same and allow said roof to be raised.

References Cited in the file of this patent

UNITED STATES PATENTS

| 1,644,406 | Stewart | Oct. 4, 1927 |
| 1,958,169 | O'Neill | May 8, 1934 |
| 2,582,635 | Kipple | Jan. 15, 1952 |
| 2,656,216 | Bobroff | Oct. 20, 1953 |

FOREIGN PATENTS

| 152,611 | Great Britain | Dec. 23, 1920 |
| 278,879 | Great Britain | Oct. 20, 1927 |
| 344,982 | Italy | Dec. 5, 1936 |
| 689,969 | Great Britain | Apr. 8, 1953 |
| 1,021,889 | France | Dec. 10, 1952 |